Oct. 16, 1962 F. L. POST 3,059,224

MAGNETIC MEMORY ELEMENT AND SYSTEM

Filed Feb. 9, 1956 3 Sheets-Sheet 1

INVENTOR.
FREDERICK L. POST

BY William V. Schelberg
AGENT

Oct. 16, 1962 F. L. POST 3,059,224

MAGNETIC MEMORY ELEMENT AND SYSTEM

Filed Feb. 9, 1956 3 Sheets-Sheet 2

INVENTOR.
FREDERICK L. POST

BY William V. Schelberg
AGENT

Oct. 16, 1962 F. L. POST 3,059,224

MAGNETIC MEMORY ELEMENT AND SYSTEM

Filed Feb. 9, 1956 3 Sheets-Sheet 3

INVENTOR.
FREDERICK L. POST
BY William V. Schelberg
AGENT

United States Patent Office 3,059,224

Patented Oct. 16, 1962

3,059,224

MAGNETIC MEMORY ELEMENT AND SYSTEM

Frederick L. Post, Poughkeepsie, N.Y., assignor to International Business Machines Corporation, New York, N.Y., a corporation of New York

Filed Feb. 9, 1956, Ser. No. 564,530
17 Claims. (Cl. 340—174)

This invention relates to magnetic memory devices and, more particularly, to improvements in such devices and in their use with magnetic core memory systems, such as described in the copending United United States patent application, Serial No. 556,289, filed December 29, 1955, now abandoned, to which this application is related as a continuation in part.

Memory components employing magnetic core storage elements are known in the prior art, with access to information stored therein attained at random addresses through the use of multiple coincidence of current pulses in employment of the principle that the response of a magnetic core having a substantially rectangular hysteresis loop is highly non-linear. Most systems of this type consist basically of a coordinate array of cores threaded by a grid of horizontal and vertical selection winding wires. Each core is maintained in one of its two remanent magnetic states, which arbitrarily are designated to represent binary "1" and "0," with information stored in a given core by delivery of a current pulse on a selected horizontal winding and a further current pulse on a selected vertical winding. The pulse polarity and windings are arranged so that the effects of both are additive only in a single core. The magnetomotive force provided by a single coordinate winding pulse is one half H, where H exceeds the threshold force of the magnetic core but is less than twice the threshold force. Only the single core that is acted upon by both the energized windings receives a force sufficiently great to change the established remanence state, provided the pulses are additive and in proper direction. The other cores linked by one or the other of the selected coordinate windings receive a one half H force and are not appreciably affected. Reading, or transmitting the stored binary information is performed in a similar manner but with the direction of the pulses applied to the selected horizontal and vertical windings in an opposite sense to that used for writing and a voltage is developed in a sense winding which links each of the cores in the coordinate plane, provided a change in state occurs in the interrogated core in that plane. This mode of transmission is destructive as reading restores the cores to a binary zero or datum state.

A major difficulty encountered in coincident current type of operation is that the current pulses applied to each selection winding both for writing and reading operations must be accurately controlled and less than the threshold force by a predetermined amount depending upon the squareness of the hysteresis loop of the cores involved. Even with such control, when the drive pulses are actually terminated the half selected cores do not return to the same magnetic position as before and successive read and write direction pulses cause excursions of minor hysteresis loops in an effect known to the art as the "delta effect" and which causes partial signals and non-uniform signals to obscure the output. Further, and particularly in reading the stored information, the inability to increase the current magnitude on each coordinate selection line of such an array limits the speed with which the cores may be switched from one state to another because of these effects and the inherent threshold characteristic.

A recently devised system that avoids dependence upon the threshold coercive force in magnetic cores and thus allows higher speed operation with driving currents of greater magnitude is described and claimed in the copending application of L. P. Hunter, Serial No. 546,180, filed November 10, 1955, now Patent Number 2,869,112, which application is assigned to the same assignee. This application is incorporated herein as part of the disclosure by reference hereto. In this system, a multipath magnetic memory element is employed having a pair of input legs and a pair of output legs. Coincident application of an input pulse to a winding on each of the input legs is required to write and read by changing the direction of flux through the entire magnetic body to a clockwise or counterclockwise direction. When an input pulse is applied to a single input leg winding, no significant flux change occurs in one of the output legs about which the sense winding is wound. In this system read and write current pulses applied to the input windings may be of any desired magnitude above a predetermined minimum and high speed operation is attained but a relatively large volume of magnetic material is switched from one remanence direction to the other and the drive pulse energy required is necessarily large.

An improved storage element and system is provided in accordance with the present invention wherein the flux direction throughout the greater part of the element remains constant at least during a sensing operation so that less driving power is required and still higher speeds of operation are attainable.

One form of the improved device is particularly adapted for high speed operation with information stored without dependence upon flux direction or in other words without distinguishing between binary one and binary zero through the opposite remanence states of the material. The device is provided with a pair of flux paths wherein the condition that flux traverses one path represents binary one and that flux traverses the other path represents binary zero where the total flux available in the member is restricted to an amount sufficient to be accommodated by one path to the exclusion of the other. Means are provided to force the flux to enter one or the other path and reading is accomplished, for example, by causing the flux to traverse a particular path about which a sense winding is positioned. If the flux is already contained in that path there is no output developed whereas if the flux is caused to enter that path the flux change induces a signal voltage.

The means for switching the flux from one path to the other operates independently of a coercive force threshold with respect to the main core body and the hysteresis characteristic of the magnetic material need not have sharply defined knees. Further, the switching means may operate at high speeds and without a maximum limitation in current magnitudes employed.

A further form of the improved memory element and operating technique is adapted for use in non-destructive sensing systems. In this form, information storage is dependent upon relative flux directions rather than the presence or absence of flux in a particular alternate flux path but the pair of output paths are provided with the flux shifted from one to the other in sensing. The flux direction remains unchanged by the switching operation and a transfer back and forth from one leg to the other may be made repeatedly without loss of the information.

An object of the invention is to provide an improved magnetic memory element.

Another object of the invention is to provide a magnetic memory element wherein information stored as a flux condition is detected by shifting the flux between alternate flux paths.

A further object is to provide a memory system employing magnetic elements having a pair of alternate flux paths with binary information represented by the presence of flux in one or the other of the paths.

A broad object of the invention is to provide a magnetic memory device capable of high speed operation.

Yet another object is to provide an improved pulse transfer controlling device.

Still another object of the invention is to provide a magnetic core memory element and system adapted to store information and deliver an indication of its storage condition non-destructively.

Other objects of the invention will be pointed out in the following description and claims and illustrated in the accompanying drawings, which disclose, by way of example, the principle of the invention and the best mode, which has been contemplated, of applying that principle.

FIGURES 4*a* to 4*d* comprise diagrams of the memory element wherein certain flux paths are illustrated as used in explaining the operation and use of the device.

Figure 5:
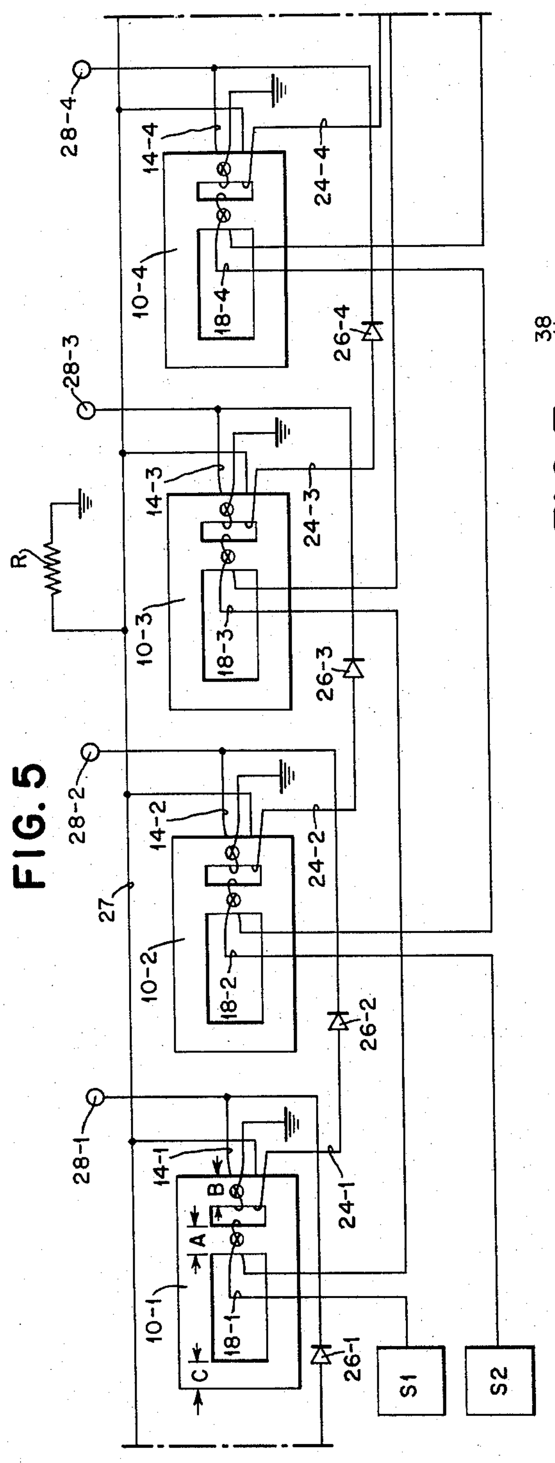

FIGURE 5 illustrates one form of the memory element as a pulse transfer device employed as a shifting register component.

Figure 6:
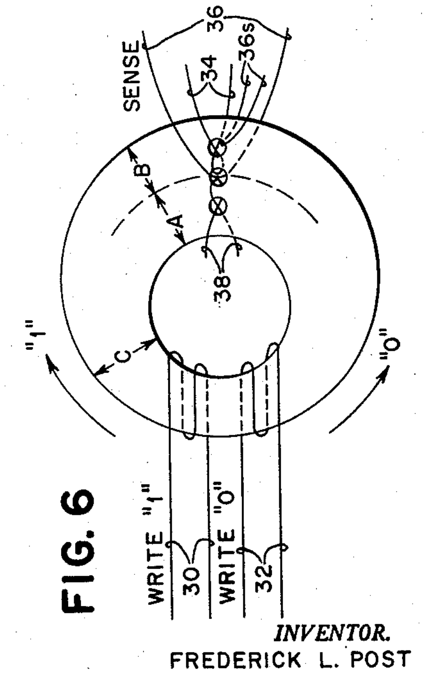

FIGURE 6 is a diagram of a multipath magnetic structure adapted for use as a non-destructive memory element.

Figure 7:
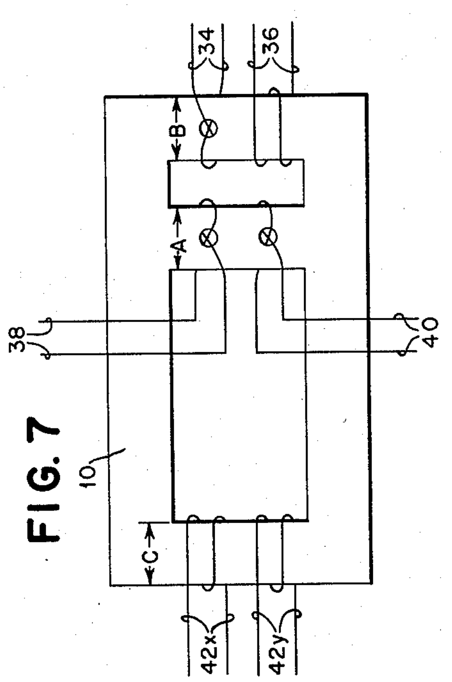

FIGURE 7 represents a modification in the form of the device shown in FIGURE 6.

Figure 8:
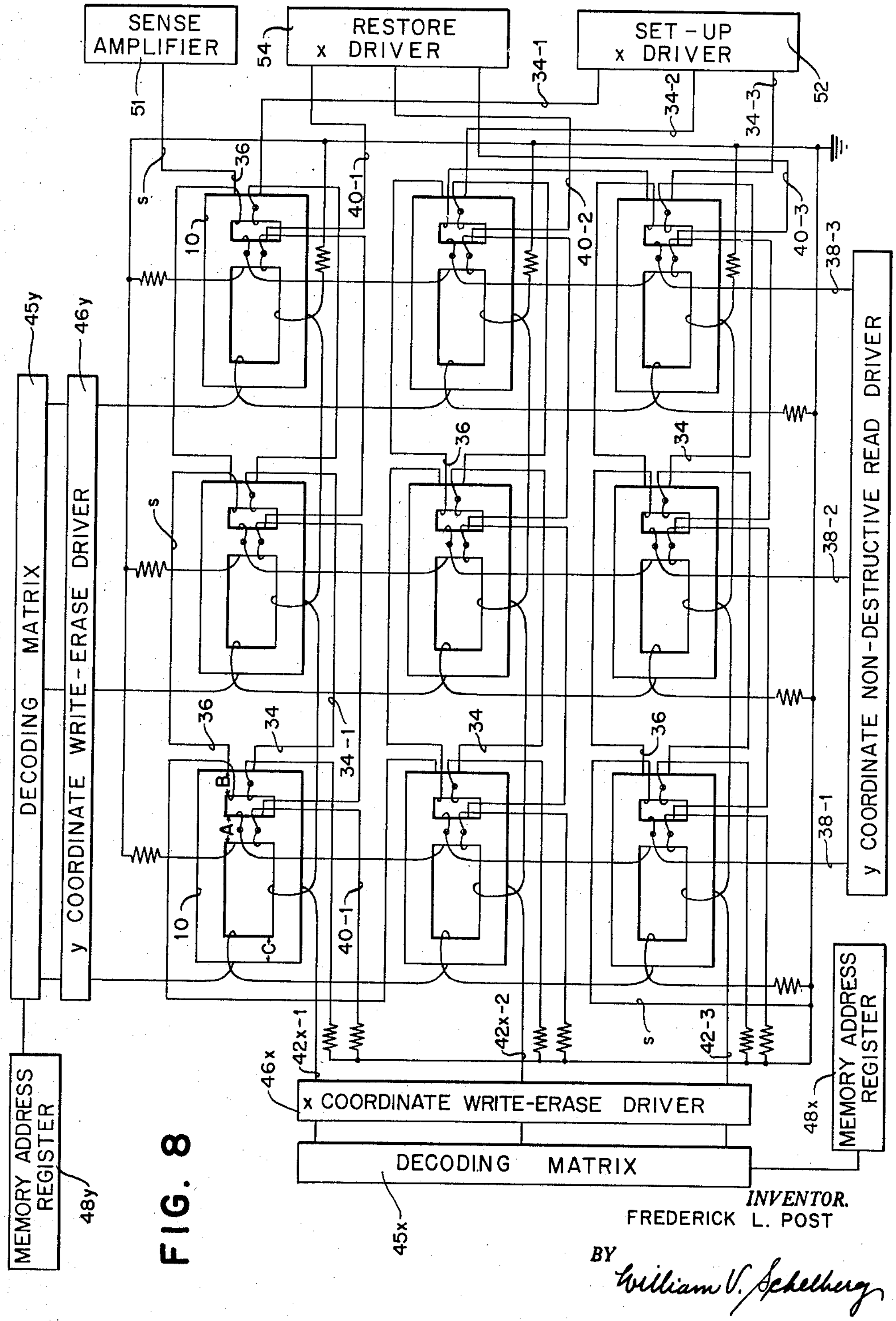

FIGURE 8 is a representation of one plane of a three dimensional array of magnetic elements operable in accordance with the improved non-destructive sensing technique.

Figure 1:
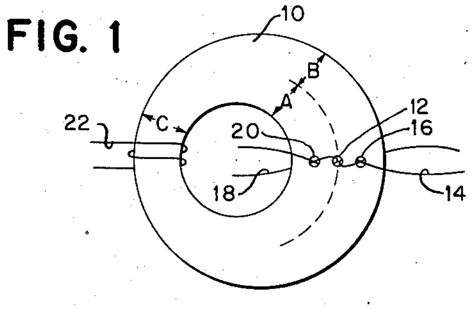
FIGURE 1 is a diagrammatic view of one form of the invention wherein a toroidal magnetic core is provided with a portion thereof subdivided into two parallel flux paths.

The basic structure of the magnetic storage element may comprise a toroidal core 10 as shown in FIGURE 1 having an aperture 12 positioned within the principal flux path so as to divide one portion of the core into two parallel sections A and B of substantially equal cross-sectional area immediately adjacent one another. The cross section of magnetic material in each of these sections may be equal to or somewhat greater than that in a further portion of the core 10 designated as section C. The opening 12 may be drilled or otherwise formed and may be positioned parallel to the axis of the core as shown or in a radial direction or at any selected angle intermediate these extremes provided the flux paths A and B are substantially equal and separate from one another. Obviously the form of the core need not be toroidal and rectangular and other configurations of both core and openings are contemplated so as to be considered within the scope of the present description and claims. A modified structure is shown for example in FIGURE 2 wherein the openings and windings to be described are given designations similar to those used in FIGURE 1.

Referring again to FIGURE 1, the toroidal core 10 is provided with a first winding 14 linking the outer core section B through the opening 12 and through an additional opening 16 intermediate the opening 12 and the outer periphery of the core. A second winding 18 links the inner core section A through the opening 12 and a further opening 20 intermediate the opening 12 and the inner periphery of the core. The windings 14 and 18 are illustrated as single turn figure eight loops but may comprise plural turns if so desired, poled in any desired manner, or may take other forms as described hereafter.

Section C of the core 10 is also provided with a winding 22 that may be pulsed to establish a remanent flux in the core. In the first embodiment to be described the direction of remanence flux established initially is immaterial and having been established the winding 22 is no longer employed.

The invention is based upon the phenomenon that a localized flux is established in sections A and B of the core 10 and circulates about the openings 16 and 20 when the windings 14 and 18, respectively are pulsed. Establishment of this localized flux path results in saturation of the associated one of the pair of paths A or B so that the flux in the principal body of the core is forced to complete its circuit through the other path. Experimental data leads to the conclusion that the localized flux path established as a result of pulsing one or the other of the windings 14 or 18 is somewhat parabolic in shape and symmetrical about the opening 16 or 20 and, since the path around the core through the other legs is longer, it remains localized. The effects of a localized flux of this kind is described more fully in the copending application, Serial Number 530,523, field August 25, 1955, now abandoned, on behalf of E. A. Brown and R. C. Lamy, which application is assigned to the same assignee.

The structure may be modified in form but it is preferable that sections A and B are generally of equal cross-sectional area and are individually greater than the section C so that the initial flux may be established in the core by pulsing the winding 22 with a current of any desired magnitude. In this case, section C is saturated and the maximum flux established in the core is limited regardless of the pulse magnitude and the remanent flux resulting may be fully accommodated by either one of the sections A or B. On the other hand, the leg C may be of greater cross-section but with the energy supplied to winding 22 limited to an amount producing such a limited flux density. Further, the sections A and B may be of unequal cross-section, however, each must be able to accommodate all the flux set up in the core without reaching saturation.

Figure 3:
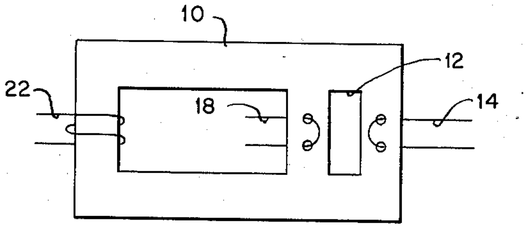
FIGURE 3 illustrates a further modification wherein the arrangement of windings associated with the parallel flux paths is shown in different form.

Referring to FIGURE 3, a modified form of the windings 14 and 18 is illustrated wherein a localized flux circulation is established in paths A and B in a manner similar to that employed in the copending application of E. A. Brown, Serial No. 383,568, filed October 1, 1953, now Patent Number 2,902,676. It is also contemplated that a localized flux may be established through use of a winding through a single hole, as disclosed in the above referred to application, provided the polarity of the control signals are proper.

Figure 2:
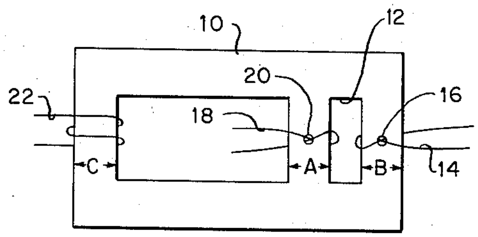
FIGURE 2 represents a modification in the structural form of the basic memory element.
Figure 4A:
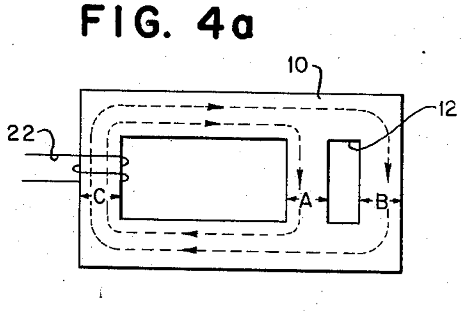

Pulsing the winding 22 in the structures shown in FIGURES 1, 2 or 3 results in establishment of a flux pattern in one or the other direction around the main magnetic circuit and a clockwise circulation is illustrated as an example in FIGURE 4*a*. As shown in this figure the flux divides substantially equally through both sections A and B. Section C may be initially saturated by the current applied to windings 22 as mentioned heretofore but sections A and B may not be saturated due to their larger individual cross-sectional area.

Figure 4B:
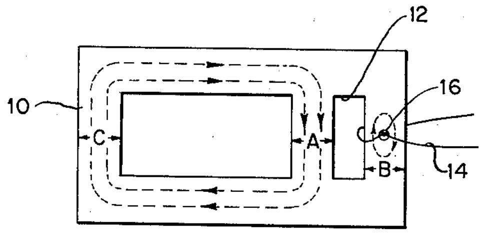
Figure 4C:
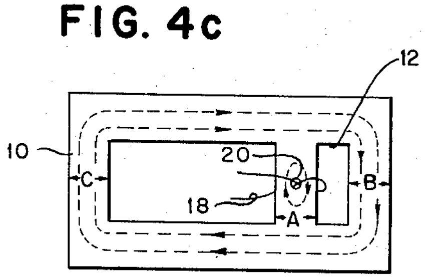

With a current pulse applied to the winding 14 associated with section B, its effective reluctance increases and the main flux traversing this path is switched to section A as shown in FIGURE 4*b*. The flux circulation around the opening 16 is shown to be clockwise in direction, however, it may be counterclockwise with the same overall result with respect to which one of the paths A or B is traversed by all of the main flux. With a current pulse applied thereafter to the winding 18, the region around the opening 20 is locally saturated and all of the main flux switches from section A to section B as shown in FIGURE 4*c*, where the pulse applied to winding 18 is of one polarity.

The pulse polarity applied to the windings 14 and 18 is immaterial in causing the switching action as only the direction of localized flux around the associated opening is changed, however other effects are produced which control the polarity of the output signal as will be described later.

In using the basic memory device thus far described both for high speed information entry and transmission, the winding 18 may perform the function of read and write zero while the winding 14 performs the function of sense and write one. As mentioned before, storage is independent of flux direction and flux traversing the path B is assumed to represent a datum condition or binary zero by the stated functions assigned to the windings.

The datum condition (FIGURE 4*c*) is established by pulsing winding 18 and thereafter a zero is written either by again pulsing 18 or by failing to do so; in either case the flux pattern remains unchanged with all the flux traversing path B. A binary one is written by pulsing winding 14 to establish the flux path through section A (FIGURE 4*b*). Reading shifts any flux in section A to section B and is destructive in that the datum condition is reestablished by reading. If a one condition had been established by pulsing the winding 14 in the polarity shown in FIGURE 4*d*, the main flux is switched to section A and a localized flux is established around the hole 16 in the counterclockwise direction. This localized flux around the hole 16 retains this remanent sense when the pulse on winding 14 is terminated. Thereafter winding 18 may be pulsed to read the information and increases the reluctance of path A causing the main flux to return to path B. For the main flux direction shown, clockwise, only a small portion of this main flux can pass intermediate the hole 12 and hole 16 as this subsection is at remanence in a downward direction and may only saturate. The subsection between hole 16 and the outer edge of the core, however, reverses direction and this right hand half of the figure eight loop 14 has a voltage pulse induced in it with the lower winding terminal as shown in the drawing made positive. With a reversal of polarity of the write one pulse previously applied to 14, the polarity of the output signal representing one also is reversed and further, with the same polarity write one pulse used and the original flux direction established as counter clockwise rather than clockwise, the output signal polarity is also reversed. Therefore, dependent upon the polarity of the write one pulse, either a positive or negative signal may indicate storage of a binary one and no output signal indicates storage of a binary zero.

Figure 4D:
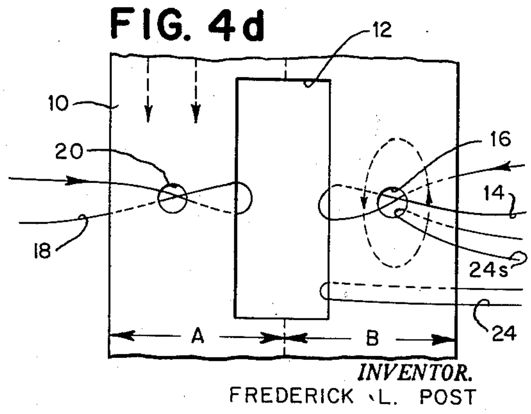

The output polarity may be made independent of the polarity of the write one signal by providing an independent sense winding 24 which links the entire section B through the opening 12 as shown in FIGURE 4*d*. The sense winding may also be threaded through the hole 16 so as to link only the inner or outer portion of section B, for example a winding 24*s*, and thus be made sensitive to one or the other polarity of the write one signal exclusively. Further, while delivery of an output signal has been described as occurring when flux is caused to enter the section B, it obviously may be at other times and gated by appropriate circuitry as when the flux decreases in section B or, either increases or decreases in section A.

The magnitude of the read and write current pulses need not be limited in this arrangement so that high operating speeds may be achieved. The device may also be used in a coordinate matrix array with two read windings 18 and two write windings 14 employed, one for each dimension, as a threshold exists in the minimum current required to cause a shift in the main flux from path A to B or vice versa and one unit of current may be applied without a significant output developed. In such an arrangement a signal to noise ratio of nine to one has been achieved. Further, an inhibit winding may be used in opposition to one of the pair of write one windings to form a three dimensional array in accordance with conventional practice.

The primary advantages of the novel memory element resides in the extremely high speed operation attainable and the lack of dependence upon the threshold characteristic of the core square loop magnetic material, provided the remanence to saturation flux density ratio is good. The pulse transfer controlling aspects of the device are demonstrated by means of a shift register shown in FIGURE 5. Here four cores 10–1 to 10–4 are interconnected with a separate sense winding 24 for each unit having one terminal connected to the write one winding 14 of the next succeeding core through a diode 26 that is poled to prevent current flow when flux is transferred from section B to section A as a one is entered in the associated core. The polarity of this diode may be reversed from that shown, with the polarity of the winding 14 or its input connection reversed as discussed previously with respect to sense winding signal polarity conditions. The other terminals of the sense windings 24 are connected to a lead 27 that is coupled to ground through a common resistor R which functions to prevent back transfer of information pulses in the manner described in the copending application, Serial No. 430,059, filed May 17, 1954, on behalf of M. K. Haynes and now issued as Patent Number 2,881,413.

The cores 10–1 and 10–3 have their windings 18 energized in series from a first shift pulse generator S1 and the cores 10–2 and 10–4 have their windings 18 energized from a further shift pulse generator S2, these generators being capable of delivery alternately in time. Now assuming a one is established in core 10–1 as by pulsing its input write one terminal 28–1 and all the remaining cores store a zero, core 10–1 has its flux passing section A and the flux in core 10–2 to 10–4 have flux passing section B. As the generator S1 operates and winding 18 of cores 10–1 and 10–3 is pulsed, no flux change occurs in core 10–3 as there is no flux to be shifted from section A but such a shift to section B occurs in core 10–1. This causes a signal to be produced on winding 24 of core 10–1 that passes the diode 26 and pulses the write one winding 14 of core 10–2, shifting the flux in that core to section A. This signal pulse flows through the winding 14–2 and completes its path to the output winding 24–1 through the resistor R and lead 27, developing a voltage drop across the resistor R of such polarity as to oppose current flow caused by the flux change in core 24–1 developing a voltage across the winding 14–1 tending to send current in retrograde through the output winding of the preceding core. A subsequent pulse from the generator S2 shifts the flux in this core 10–2 back to section B and develops an output to drive core 10–3 and so on with each core in succession. A single binary one may be circulated as described or a pattern of ones and zeros circulated as established in the cores through pulsing selected ones of the input terminals 28. In this manner, for example, the register may serve to convert information in parallel form to serial form or vice versa. It is contemplated that a winding comparable to winding 22 in FIGURES 1 to 3 also be provided on the cores in this arrangement and pulsed simultaneously with the winding 18 for the associated core so as to momentarily increase the flux density at the time of the shift to increase the volt-time product of the output.

A device essentially of the same construction as that described but adapted for non-destructive sensing of its magnetic storage condition is shown in FIGURE 6. Here storage is dependent upon the flux direction rather than its presence in one of the short parallel paths A or B. A pair of input windings 30 and 32 are provided about section C or the core which windings are adapted to be pulsed to establish a flux direction representative of binary "1" and "0," respectively. Obviously a single winding may be used to generate opposed flux directions with application of opposite polarity signals. Windings 34 and 36 or 36*s* are provided on section B and winding 38 on section A, corresponding with the windings 14, 24 or 24*s* and 18 in the previous embodiment. The winding 34 is termed a set up winding and drives the flux in the main core body out of section B and into section A while winding 38 is termed a read winding and drives the flux out of section A and into section B and winding 36 is a sense winding.

Initially the winding 30 or 32 is pulsed to establish the information representing remanence direction, then the set up winding 34 is pulsed with a current in either polarity to drive all this flux into section A. To read, the winding 38 is pulsed, also with current of either polarity, and the flux in section A is driven back into section B where the increase in flux causes an output voltage to develop in winding 36. The polarity of the voltage developed in winding 36 is dependent upon the flux direction and consequently the storage of ones and zeros may be distinguished. The set up winding 34 may again be pulsed and a further read operation will once more deliver the information as the established flux direction is not destroyed with repeated reading.

Such a non-destructive memory element may be adapted for use in two or three dimensional arrays by providing a further figure eight or equivalent winding, such as that shown in FIGURE 3 for example and requiring a minimum of three holes in each path, operable on the flux path A and employing a pair of input windings of like polarity for pulsing section C in coordinate fashion as in a coincident current system. A structure having this additional winding on section A is shown in FIGURE 7 where a figure eight winding 40 is provided along with a pair of windings 42*x* and 42*y* that embrace the input section C. A two dimensional system using the structure of FIGURE 7 as the storage element is shown in FIGURE 8 where a plurality of elements 10 are arranged in coordinate columns and rows as in a conventional array and considered as one plane of a three dimensional system wherein a plurality of like two dimensional arrays or Z planes are arranged so that the X and Y coordinate windings link cores in each Z plane in series. In this arrangement selection of a particular X and a particular Y winding address in coincidence may saturate the section C of a like positioned core in each of the Z planes to establish one or the other flux direction. The X, Y address leads 42*x* and 42*y* then select a multbit binary word composed of these several like positioned cores for writing and erasing. A unipolar sense winding *s* is provided coupled to the sense windings 36 and is individual to each such Z plane so that when a word is read out of the array each bit signal is delivered in parallel to the sense winding for that plane and may be a zero or a one as indicated by its polarity. To write a word in such an array write address lines 42*x* and 42*y* are pulsed in a positive or write "1" sense and each core in the word line tends to store a "1" unless an inhibit winding Z for a bit position plane is energized. In this manner the zero bits of a binary word are entered by counteracting the magnetomotive force effect of either one of these windings in that plane.

Coincidence of two input write signals is required to set up a remanence flux direction in the core body of a selected element and operation of the system will be explained considering entry of a one in the core 10 located at the upper left hand corner of the array. The address registers 48*x* and 48*y* select this address and, through the decoding matrices 45 and drivers 46, line 42*x*-1 and 42*y*-1 are pulsed in a like sense. Both pulses act on the single core selected and set up a flux direction assumed to be clockwise and representing a binary one state. To erase this information bit the drivers 46*x* and 46*y* may be controlled to pulse these lines simultaneously in an opposite sense and reestablish a zero flux direction. Proceeding from the condition that a one state is stored in the addressed core it may also be assumed that the remaining cores have either a zero or one condition or flux direction established in them. To read this information from the array, the Y coordinate read driver 50 is first operated to pulse the leads 38-1 to 38-3 and energize the windings 38 on each core driving the portion of flux established in the cores, regardless of its direction, out of section A and into section B of each core. Following this operation, to read the information in the particular core selected, a set up driver 52 is operated to pulse the line 34-1 energizing the windings 34 of each core in the selected *x* coordinate direction particular to the address of the selected core. This causes the flux in the cores of this selected row to switch from section B back to section A. Thereafter the *y* coordinate read driver 50 is operated to pulse the line 38-1 energizing the windings 38 of the cores in the selected *y* coordinate direction particular to the address of the selected core. This switches the flux in section A back to section B only in the addressed core and a signal is developed on the winding 36 and sense line *s* with a polarity indicative of the flux sense in the core, which signal is amplified by a device 51. None of the other cores in the addressed *y* column produce any output as the flux in these cores is already in section B.

Following this reading, a restore driver 54 may be operated to pulse the lead 40-1 and restore the flux in the non-selected cores of the addressed row back to section B before proceeding to read at another address. The information from the same core may be repeatedly read out, however, by again operating the set up driver 52 and pulsing the line 34-1 to restore the flux in the addressed core to section A so that a subsequent operation of the read driver 50 to energize lead 38-1 will again transmit the information held by the addressed core. If desired, the restore driver 54 may be eliminated and the flux in the non-selected cores restored to section B or unset by operating the read driver 50 to pulse the windings 38 in all columns and blocking a gate in the sense winding circuit at this time. This alternative mode of operation is not as rapid, however, as the restore driver may be operated at the same time as the set up driver 52 in preparing a further core for reading in the illustrated arrangement.

The system shown in FIGURE 8 may be further modified by employment of sense windings linking only the outer portion of section B of each core, such as the windings 36*s* illustrated in FIGURE 6. With this arrangement a bipolar sense winding circuit configuration may be used and more effective noise cancellation obtained as a binary one flux condition may be indicated by a relatively large output voltage and a binary zero condition by a small output voltage rather than by the relative polarity of signals.

The drivers, decoders and registers shown in block diagram form in FIGURE 8 may be conventional components known to the art. The address selecting systems 45 may be in the form of a crystal diode matrix, for example. The drivers 46 may comprise magnetic cores as shown in the copending application, Serial Number 440,983, filed July 2, 1954, on behalf of R. G. Counihan, now Patent No. 2,902,677, dated September 1, 1959, or transistors as shown in application, Serial Number 511,082 entitled "Transistor Amplifiers," filed May 25, 1952, on behalf of J. B. Mackay et al., now Patent No. 2,990,539, dated June 27, 1959.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the following claims.

What is claimed is:

1. A magnetic core memory device comprising a closed magnetic circuit capable of assuming stable remanence conditions and having a portion thereof divided into two parallel flux paths, means for establishing a remanence flux in said magnetic circuit, a separate winding inductively associated with each of said flux paths and operable to increase the reluctance to the flow of said remanence flux therein when energized, and means for selectively energizing said windings to cause said remanence flux to traverse a selected one of said parallel flux paths.

2. A magnetic core memory device comprising a closed magnetic circuit capable of assuming stable remanence conditions and having a portion thereof divided into two parallel flux paths, means for establishing a remanence flux in said magnetic circuit of a density that may be accommodated by either one of said parallel flux paths without causing saturation therein, separate winding means inductively associated with each of said flux paths and operable to increase the reluctance to the flow of said remanent flux therein when energized, and means for selectively energizing said winding means to cause said remanent flux to traverse a selected one of said parallel flux paths.

3. A magnetic core memory device as set forth in claim 2 including means for detecting a shift in flux from one of said parallel paths to the other.

4. A magnetic core memory device comprising a closed magnetic circuit capable of assuming stable remanence conditions and having a portion divided into two parallel flux paths, means for establishing a remanence flux in said magnetic circuit of a density that may be accommodated by either one of said flux paths without causing saturation therein, a separate winding inductively associated with each of said flux paths and operable to cause a localized flux circulation confined within the associated path when energized and thereby increase the reluctance of that path to the flow of said remanence flux, means for selectively energizing said windings to cause said remanence flux to traverse a selected one of said parallel paths, and means for detecting a shift of said remanence flux from one path to another.

5. A magnetic core memory device as set forth in claim 4 wherein said means for establishing a remanence flux in said magnetic circuit comprises a winding embracing a portion of said magnetic circuit separate from said parallel paths, said portion having a cross sectional area less than that of either one of said parallel paths.

6. A binary storage device comprising a magnetic circuit capable of assuming stable remanence conditions and having a portion thereof divided into two parallel flux paths wherein the condition of flux traversing one of said paths represents binary one information and the condition of flux traversing the other of said paths represents binary zero information, means for establishing a remanence flux in said magnetic circuit, separate winding means inductively coupled with each of said parallel flux paths and adapted to increase the reluctance of the associated path when energized and force the remanence flux established in said magnetic circuit to traverse the other of said paths, means for selectively energizing said windings to establish an information condition, and means for subsequently detecting the condition established.

7. A binary storage device as set forth in claim 6 wherein said means for establishing a remanence flux in said magnetic circuit comprises a winding embracing the portion of said magnetic core apart from said parallel flux paths, said portion having a cross sectional area less than that of either of said two parallel paths.

8. A binary storage device as set forth in claim 7 wherein said winding means associated with each of said parallel flux paths is adapted to produce a localized flux circulation confined within the respective ones of said paths when energized.

9. A binary storage device as set forth in claim 8 wherein said winding means comprise figure eight windings embracing each of said parallel paths individually through openings through said parallel paths substantially on the center line thereof.

10. A binary storage device comprising a magnetic circuit capable of assuming stable remanence conditions and having a portion divided into two parallel flux paths wherein the condition of flux traversing at least one of said paths in one direction represents binary one information and in the other direction represents binary zero information, separate winding means inductively coupled with each of said paths and adapted when energized to increase the effective reluctance of the associated path and cause the remanence flux established in said magnetic circuit to traverse the other of said paths, means for establishing an information representing remanence flux direction in said magnetic circuit wherein the remanence flux may be accommodated in either one of said parallel paths without saturation, and means for subsequently energizing said winding means to non-destructively determine the flux direction established.

11. A binary storage device comprising a magnetic circuit capable of assuming stable remanence conditions and having a portion divided into two parallel flux paths wherein the condition of flux traversing at least one of said paths in one direction represents binary one information and in the other direction represents binary zero information, means for establishing an information representing remanence flux in said magnetic core comprising a winding embracing a portion of said circuit separate from said parallel paths, said portion having a cross sectional area less than that of either one of said two paths, a separate control winding inductively coupled with each of said paths and adapted to cause a localized flux circulation confined within the associated path when energized and thereby increase the reluctance thereof to flow of said information representing flux, means for energizing said control windings in a predetermined sequence for non-destructively sensing the information representing flux direction established.

12. A binary storage device comprising a magnetic circuit capable of assuming stable remanence conditions and having a portion divided into two parallel flux paths wherein the condition of flux traversing at least one of said paths in one direction represents binary one information and in the other direction represents binary zero information, means for establishing a remanence flux in said magnetic circuit of a desired direction having a density such that it may be accommodated by either one of said parallel flux paths without saturation, individual control winding means inductively coupled with each of said parallel paths and comprising figure eight winding loops passing through an opening dividing said paths into sub-sections of substantially equal cross sectional area, means for selectively energizing said control windings to cause a localized flux circulation about said openings and confined within the associated path, output winding means inductively associated with one of said paths, said control winding associated with said one path being operable to transfer flux to the other of said paths and the control winding means associated with the other of said paths being operable to shift the flux in the other of said paths to said one path, change in flux in said other path being effective to develop a voltage in said output winding, said voltage polarity being indicative of the binary information stored.

13. In a magnetic memory array, a plurality of binary storage devices capable of assuming stable remanence conditions and arranged in coordinate rows and columns, each said storage device having a first and second portion wherein said second portion is divided in two parallel flux paths each having a cross sectional area at least equal to that of said first portion, input winding means associated with said first portion, circuit means connecting an input winding means of each said device in each individual column and each individual row, means for energizing said circuit means for a selected row and a selected column in coincidence to establish a flux condition in the addressed device representative of binary information by its direction, individual control winding means inductively associated with the parallel flux paths of each said storage device, the control windings in one of said paths being series connected along said rows and the control winding means for the other of said path being series connected along said column, a sense winding individual to said one of said parallel paths, circuit means connecting said sense windings of said plurality of storage devices in series, means for energizing the control winding circuit corresponding to a selected one of said rows, means for energizing the control winding circuit corresponding to a selected one of said columns and causing an output signal to develop in said sense winding corresponding to the information stored in the storage device located in that row and column.

14. In a magnetic memory array as set forth in claim 13 wherein said control winding means individual to said parallel flux paths comprise figure eight windings passing through an opening dividing each said parallel path into subsections of substantially equal cross-sectional area, and said sense winding individual to one of said parallel flux paths embraces only one of said sub-sections.

15. In a magnetic memory array as set forth in claim 14 wherein said circuit means connecting said sense windings of said plurality of storage devices in series connects half said sense windings in one polarity sense and the other half in the opposite polarity sense.

16. A pulse transfer controlling device comprising a magnetic core defining a closed flux path of magnetic material capable of attaining one or the other stable residual state, a first opening positioned through said flux path so as to provide parallel sections of substantially equal cross sectional area, a further opening positioned through each of said parallel sections to provide sub-sections likewise of substantially equal cross sectional area, winding means individual to each of said sections and passing through said further openings in figure eight fashion, an output winding positioned through said first opening and embracing one of said parallel sections, means for establishing a remanence flux condition in a desired one of said stable states wherein the flux density provided is insufficient to saturate one of said sections alone, and means for energizing said winding means for producing an output voltage as flux is shifted to one of said sections, the polarity of said output voltage being indicative of the residual state established.

17. A pulse transfer controlling device comprising a magnetic core defining a closed magnetic circuit of a material capable of attaining one or the other stable residual state, a first opening positioned through said flux path so as to provide parallel sections of substantially equal cross-sectional area, a further opening positioned through each of said parallel sections so as to provide sub-sections likewise of substantially equal cross-sectional area, control winding means individual to each of said sections and passing said further openings in figure eight fashion, an output winding positioned through said further opening of one of said parallel sections and embracing only one of said sub-sections, means for establishing a remanence flux condition in said magnetic circuit in a desired one of said stable states wherein the flux density is insufficient to saturate one of said parallel sections alone, and means for energizing said control winding means and thereby producing a signal voltage in said output winding as said remanence flux is shifted from one of said sections to the other.

References Cited in the file of this patent

UNITED STATES PATENTS

| | | |
|---|---|---|
| 2,519,426 | Grant | Aug. 22, 1950 |
| 2,733,424 | Chen | Jan. 31, 1956 |
| 2,734,184 | Rajchman | Feb. 7, 1956 |
| 2,769,163 | An Wang | Oct. 30, 1956 |
| 2,769,968 | Schultheis | Nov. 6, 1956 |
| 2,783,456 | Steagall | Feb. 26, 1957 |
| 2,803,812 | Rajchman | Aug. 20, 1957 |
| 2,814,792 | Lamy | Nov. 26, 1957 |
| 2,814,794 | Bauer | Nov. 26, 1957 |
| 2,818,555 | Lo | Dec. 31, 1957 |
| 2,818,556 | Lo | Dec. 31, 1957 |
| 2,842,755 | Lamy | July 8, 1958 |
| 2,869,112 | Hunter | Jan. 13, 1959 |

FOREIGN PATENTS

| | | |
|---|---|---|
| 814,455 | Great Britain | June 3, 1959 |